United States Patent
Sakayama et al.

(10) Patent No.: US 9,212,712 B2
(45) Date of Patent: Dec. 15, 2015

(54) BRAKE LINING FOR RAILWAY VEHICLE, AND DISC BRAKE EQUIPPED WITH THE SAME

(71) Applicant: NIPPON STEEL & SUMITOMO METAL CORPORATION, Tokyo (JP)

(72) Inventors: Yuiko Sakayama, Tokyo (JP); Takanori Katou, Tokyo (JP); Atsushi Sakaguchi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/378,105

(22) PCT Filed: Feb. 1, 2013

(86) PCT No.: PCT/JP2013/000560
§ 371 (c)(1),
(2) Date: Aug. 12, 2014

(87) PCT Pub. No.: WO2013/121731
PCT Pub. Date: Aug. 22, 2013

(65) Prior Publication Data
US 2015/0001015 A1    Jan. 1, 2015

(30) Foreign Application Priority Data
Feb. 14, 2012    (JP) ................. 2012-029158

(51) Int. Cl.
*F16D 65/092*    (2006.01)
*B61H 5/00*    (2006.01)
*F16D 55/225*    (2006.01)
*F16D 69/04*    (2006.01)
*B61H 13/00*    (2006.01)

(52) U.S. Cl.
CPC ............... *F16D 65/092* (2013.01); *B61H 5/00* (2013.01); *B61H 13/00* (2013.01); *F16D 55/225* (2013.01); *F16D 69/0408* (2013.01); *F16D 2069/0433* (2013.01); *F16D 2069/0441* (2013.01)

(58) Field of Classification Search
USPC ....... 188/218 XL, 73.1, 244, 250 G, 242, 243
See application file for complete search history.

(56) References Cited

U.S. PATENT DOCUMENTS 2,058,952 A * 10/1936 Cobb, Jr. ................. 188/243
4,090,591 A *  5/1978 Pollinger et al. ........... 188/73.1
4,333,550 A *  6/1982 Shirai .................. 188/72.2
8,863,916 B2 * 10/2014 Kuhr ................... 188/250 R

FOREIGN PATENT DOCUMENTS

| DE | 102005034861 A1 | * | 2/2007 |
|---|---|---|---|
| EP | 581988 A1 | * | 2/1994 |
| GB | 0148856 A | * | 10/1922 |
| JP | 2008-267527 | | 11/2008 |
| JP | 2008-281156 | | 11/2008 |

* cited by examiner

*Primary Examiner* — Melanie Torres Williams
(74) *Attorney, Agent, or Firm* — Clark & Body

(57) ABSTRACT

In a disc brake for a railway vehicle includes a friction member facing a frictional surface of a disc fixed to a wheel or axle of the vehicle. A base plate holds the member on a front surface and a guide plate is at the center of a back surface of the base plate and accommodated in a concave portion of the caliper arm. A base plate front surface is in parallel to a frictional surface of the member. A thickness of the base plate is larger on an inner circumferential side than an outer circumferential side. A thickness of the guide plate is smaller than a depth of the concave portion of the caliper arm. In a state where the frictional surface of the member faces the frictional surface of the disc in parallel, the guide plate is fitted, with play, into the concave portion of the caliper arm.

16 Claims, 2 Drawing Sheets

FIG. 2
(a) 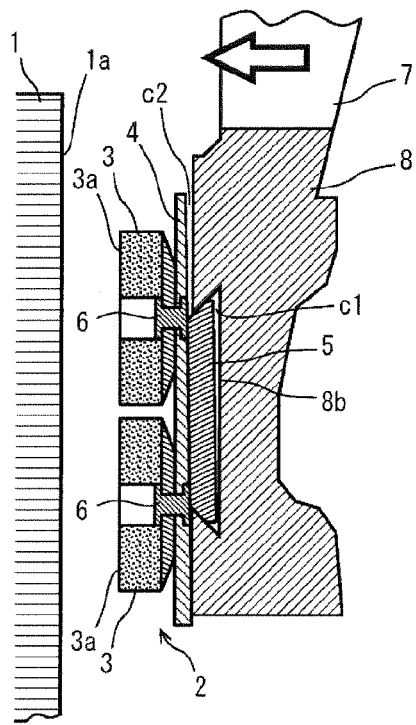
(b) 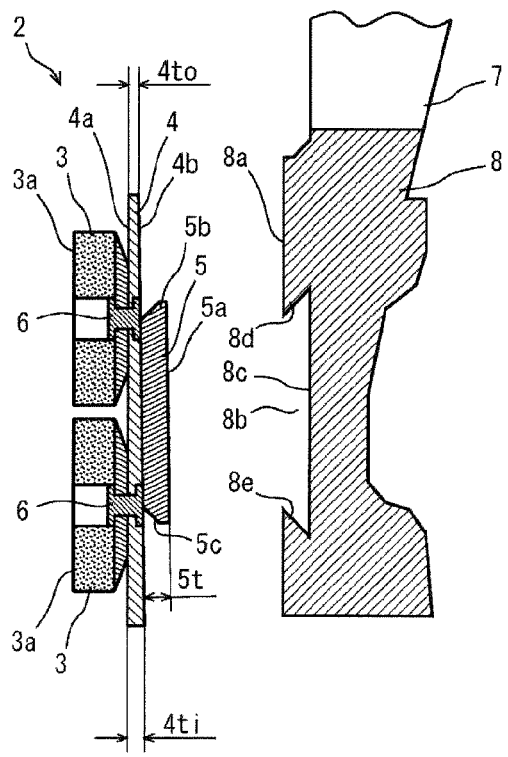
FIG. 3
(a) 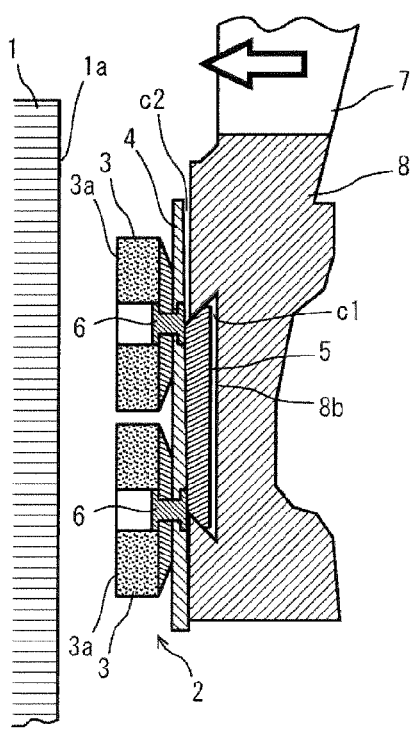
(b) 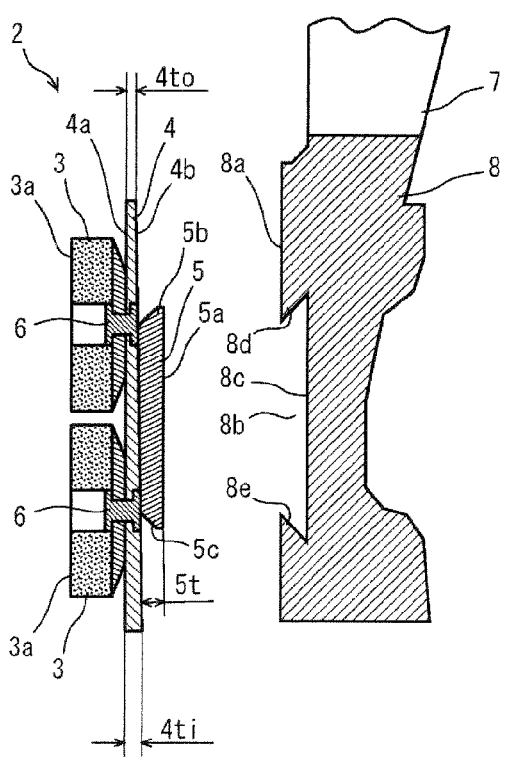

BRAKE LINING FOR RAILWAY VEHICLE, AND DISC BRAKE EQUIPPED WITH THE SAME

TECHNICAL FIELD

The present invention relates to a disc brake using a floating brake caliper as a braking device for a railway vehicle, and particularly relates to a brake lining for a railway vehicle pressed against a frictional surface of a brake disc fixed to a wheel or an axle and to a disc brake for a railway vehicle equipped with the brake lining.

BACKGROUND ART

Following speeding up and growing in size, a disc brake is frequently used as a braking device for a land transportation vehicle such as a railway vehicle, an automobile or a motorcycle. The disc brake is a device that produces a braking force by friction derived from the sliding contact between a brake disc (hereinafter, also simply "disc") and a brake lining (hereinafter, also simply "lining"). In a case of the disc brake for the railway vehicle, the braking force is generated by pressing the lining, by a brake caliper (hereinafter, also simply "caliper"), against a frictional surface of the disc which has been mounted and fixed to a wheel or an axle. In this manner, the rotation of the wheel or the axle is slowed or stopped so that the speed of the vehicle is controlled.

Normally, the friction member of the lining is gradually worn away as a result of repetition of braking. However, if the friction member is partially worn away, braking performance becomes unstable. Therefore, to prevent the partial wear of the friction member, it is preferable that a pressing load is uniformly applied to the entire regions of the friction member during braking.

Furthermore, during braking, temperatures of the frictional surfaces of the lining and the disc increase by frictional heat. This temperature increase tends to be more conspicuous in conditions in which a braking load increases, to be specific, in conditions in which the traveling speed of the vehicle is high or in which the vehicle weight is heavy. In the actual traveling, it is desired to prevent thermal damages on the lining and the disc and to improve the durability of the lining and the disc. To this end, it is necessary to make the contact between the lining and the disc as uniform as possible and to reduce the frictional heat generated as a result of the contact during braking.

The caliper includes caliper arms extending to stride over the disc and the caliper arms hold linings, respectively. The calipers are mainly classified into a floating type and an opposed type, depending on the arrangement configuration of a drive source, for example, pistons or diaphragms, for pressing the lining against the disc. In a case of the floating type, the pressing drive source such as the pistons or diaphragms is provided only on one of the caliper arms each holding the lining. In a case of the opposed type, the pressing drive sources such as pistons or diaphragms are provided on both caliper arms, respectively.

For the railway vehicle, the disc brake using the floating caliper is often used. The disc brake will be described while referring only to the disc brake of the floating type.

FIG. 1 shows an example of a configuration of a conventional disc brake for a railway vehicle, illustrating one side thereof on which the pressing drive source is not provided. In the figure, FIG. 1(a) is a plan view in which a lining is viewed from a front surface side, FIG. 1(b) is a plan view in which the lining is viewed from a back surface side, FIG. 1(c) is an enlarged cross-sectional view taken along A-A of FIG. 1(a), and FIG. 1(d) is a cross-sectional view in a state in which the lining shown in FIG. 1(c) is detached from a caliper arm.

A conventional lining (hereinafter, "conventional type lining") 12 shown in FIG. 1 is configured to include a friction member 3 that faces a frictional surface 1a of a disc 1, a base plate 14 having a fixed thickness and holding the friction member 3 on a front surface 14a, and a guide plate 15 fixedly provided at the center of a back surface 14b of the base plate 14. In FIG. 1, it is shown that a plurality of small-block-shaped friction members 3 are arranged, i.e., pairs of friction members 3 are arranged in a radial direction of the disc 1 and seven friction members 3 are arranged in a circumferential direction of the disc 1, that is, 14 friction members 3 are arranged in all. The friction members 3 are attached to the base plate 14 by rivets 6, respectively. A spring member may be arranged between the friction members 3 and the base plate 14.

The conventional type lining 12 is mounted to a lining holder (hereinafter, also simply "holder") incorporated into each caliper arm, and set in a state in which a frictional surface 3a of each friction member 3 faces the frictional surface 1a of the disc 1 in parallel. As shown in FIGS. 1(c) and 1(d), on the side on which the pressing drive source such as pistons is not provided (hereinafter, also "non-pressing-drive-source side"), a holder 8 is integrally incorporated into the caliper arm 7, and a concave portion 8b that accommodates therein the guide plate 15 of the lining 12 is formed in this holder 8. The guide plate 15 of the lining 12 is set in a state in which upper and lower edges 15b and 15c of the guide plate 15 are engaged with upper and lower edges 8d and 8e of the concave portion 8b of the holder 8, respectively while a back surface (a surface that is on a back surface side relative to the lining) 15a closely contacts a bottom surface (a surface that is on a front surface side relative to the lining) 8c of the concave portion 8b of the holder 8. Such strong coupling of the guide plate 15 with the concave portion 8b of the holder 8 enables the non-pressing-drive-source side lining 12 to be strongly held to the holder 8 directly incorporated into the caliper arm 7.

Meanwhile, on the side on which the pressing drive source is provided (hereinafter, also "pressing-drive-source side"), a holder is attached to the pressing drive source, and a concave portion similar to that on the non-pressing-drive-source side is formed in this holder. Similarly to the non-pressing-drive-source side, the strong coupling of the guide plate with the concave portion of the holder enables the pressing-drive-source side lining 12 to be strongly held to the holder incorporated into the caliper arm via the pressing drive source.

In the conventional disc brake configured as described above, during braking, on the pressing-drive-source side, the pressing drive source is actuated, whereby a pressing force is loaded onto the lining 12 from the pressing drive source and the lining 12 is pressed against the disc. On the other hand, as shown in FIG. 1(c), on the non-pressing-drive-source side, a reaction force to the pressing force on the pressing-drive-source side is applied to the caliper arm 7, and the caliper arm 7 slidably moves toward the disc 1 (see a white arrow in FIG. 1(c)) and the lining 12 is pressed against the disc 1. At this time, on both the pressing-drive-source side and the non-pressing-drive-source side, the pressing force loaded onto the lining 12 directly acts on the guide plate 15 of the lining 12 via the holder 8 of the caliper arm 7. That is, the pressing force loaded onto the lining 12 does not directly act on the base plate 14 of the lining 12 but intensively acts on the guide plate 15 of the lining 12 because of a structure of a mounted portion of the lining 12 to the caliper arm 7.

In the case of the disc brake using the floating caliper, on the non-pressing-drive-source side, a phenomenon occurs that the caliper arm 7 is bent to open as the lining 12 is pressed against the disc 1 during braking. Owing to this, the friction member 3 on the non-pressing-drive-source side exhibits a tendency that a higher load acts on a region corresponding to an outer circumferential side of the disc 1 (hereinafter, also "outer circumferential-side region") than on a region corresponding to an inner circumferential side of the disc 1 (hereinafter, also "inner circumferential-side region"). This particularly accelerates the wear of the outer circumferential-side region of the friction member 3 and the partial wear of the friction member 3, and even probably accelerates the partial wear of the disc 1.

To tackle these problems, various types of disc brakes with improved structures have been proposed recently with views of making uniform the pressure of the contact surfaces between the lining and the disc during braking.

For example, each of Patent Literatures 1 and 2 discloses a disc brake configured as follows. In anticipation that the caliper arm is bent to open on the side on which pistons serving as the pressing drive force are not provided during braking, the friction member is mounted to the holder of the caliper arm in a state in which the frictional surface of the friction member is inclined at a predetermined angle with respect to the frictional surface of the disc. In a case of Patent Literature 1, by changing the shape of the holder without changing the structure of the lining, the frictional surface of the friction member is inclined with respect to the frictional surface of the disc. In a case of Patent Literature 2, by changing the thickness of the friction member of the lining without changing the structure of the holder, the frictional surface of the friction member is inclined with respect to the frictional surface of the disc. According to such a disc brake, during braking, the contacts of the friction member with the disc starts from the inner circumferential-side region, and the frictional surface of the friction member contacts the frictional surface of the disc substantially in a parallel state by the bending of the caliper arm to follow the applied load. As a result, the surface pressure is made constant over the entire regions of the friction member.

However, in the disc brakes described in Patent Literatures 1 and 2, at the beginning of braking, the inner circumferential-side region of the friction member contacts the disc but the outer circumferential-side region thereof does not contact the disc. Owing to this, the partial wear of the friction member still probably occurs.

CITATION LIST

Patent Literature

Patent Literature 1: Japanese Patent Application Publication No. 2008-281156
Patent Literature 2: Japanese Patent Application Publication No. 2008-267527

SUMMARY OF INVENTION

Technical Problem

The present invention has been made in light of the aforementioned problems, and an object of the present invention is to provide a brake lining for a railway vehicle and a disc brake for a railway vehicle equipped with this brake lining capable of contacting a friction member with a brake disc over entire regions from the beginning of braking on a non-pressing-drive-source side of the disc brake using a floating brake caliper, uniformly applying a pressing load onto the entire regions of the friction member during braking, and eventually improving durability.

Solution to Problem

In order to achieve the above object, the gist of the present invention lies in a brake lining for a railway vehicle shown in (I) below and a disc brake for a railway vehicle shown in (II) below.

(I) A brake lining which is provided to a disc brake for a railway vehicle using a floating brake caliper, the floating brake caliper including caliper arms each striding over a brake disc fixed to a wheel or an axle of the railway vehicle; the brake lining held by each of the caliper arms; and a pressing drive source provided only on one of the caliper arms each holding the brake lining, characterized in that the brake lining held by the caliper arm on a side on which the pressing drive source is not provided, the brake lining comprises:

a friction member facing a frictional surface of the brake disc; a base plate holding the friction member on a front surface; and a guide plate fixedly provided at center of a back surface of the base plate, and accommodated in a concave portion of the caliper arm, on the side on which the pressing drive source is not provided, the front surface of the base plate is in parallel to a frictional surface of the friction member, a thickness of the base plate is larger on a side corresponding to an inner circumferential side of the brake disc than on a side corresponding to an outer circumferential side of the brake disc, and a thickness of the guide plate is smaller than a depth of the concave portion of the caliper arm, and on the side on which the pressing drive source is not provided, in a state in which the frictional surface of the friction member faces the frictional surface of the brake disc in parallel, the guide plate is fitted, with play, into the concave portion of the caliper arm.

It is preferable that in the brake lining described in (I) above, the back surface of the base plate is an inclined surface inclined with respect to the front surface.

It is preferable that in these brake linings, the thickness of the base plate is larger on the side corresponding to the inner circumferential side of the brake disc by 0.25 mm to 2.0 mm than on the side corresponding to the outer circumferential side of the brake disc.

In these brake linings, in a state in which the guide plate is fitted, with play, into the concave portion of the caliper arm, a cavity is present between the back surface of the guide plate and the concave portion of the holder and a cavity is present between the back surface of the base plate and the caliper arm.

(II) A disc brake for a railway vehicle characterized by including the brake lining described above.

Advantageous Effects of Invention

In the brake lining and the disc brake for the railway vehicle according to the present invention, since the frictional surface of each friction member is arranged to face the frictional surface of the disc in parallel on the non-pressing-drive-source side, the friction member can contact the disc over the entire regions from the beginning of braking. Besides, the lining is movably attached to the caliper arm since the guide plate is fitted, with play, into the concave portion of the caliper arm, and the thickness of the guide plate is smaller than the depth of the concave portion of the caliper arm. Therefore, during braking, on the non-pressing-drive-source side, the base plate contacts the caliper arm in a wide range to follow the bending of the caliper arm. The pressing force loaded onto the lining thereby does not act on the guide plate but directly acts on the base plate, and it is thereby possible to uniformly apply the pressing load to the entire regions of the friction member. As a consequence, it is possible to prevent the partial wear of the friction members and improve the durability.

BRIEF DESCRIPTION OF DRAWINGS

FIG. 2 shows an example of a configuration of a disc brake for a railway vehicle according to the present invention, illustrating one side thereof on which the pressing drive source is not provided; and FIG. 3 shows a modification of a configuration of the disc brake for a railway vehicle according to the present invention, illustrating one side thereof on which the pressing drive source is not provided.

DESCRIPTION OF EMBODIMENTS

Figure 1:
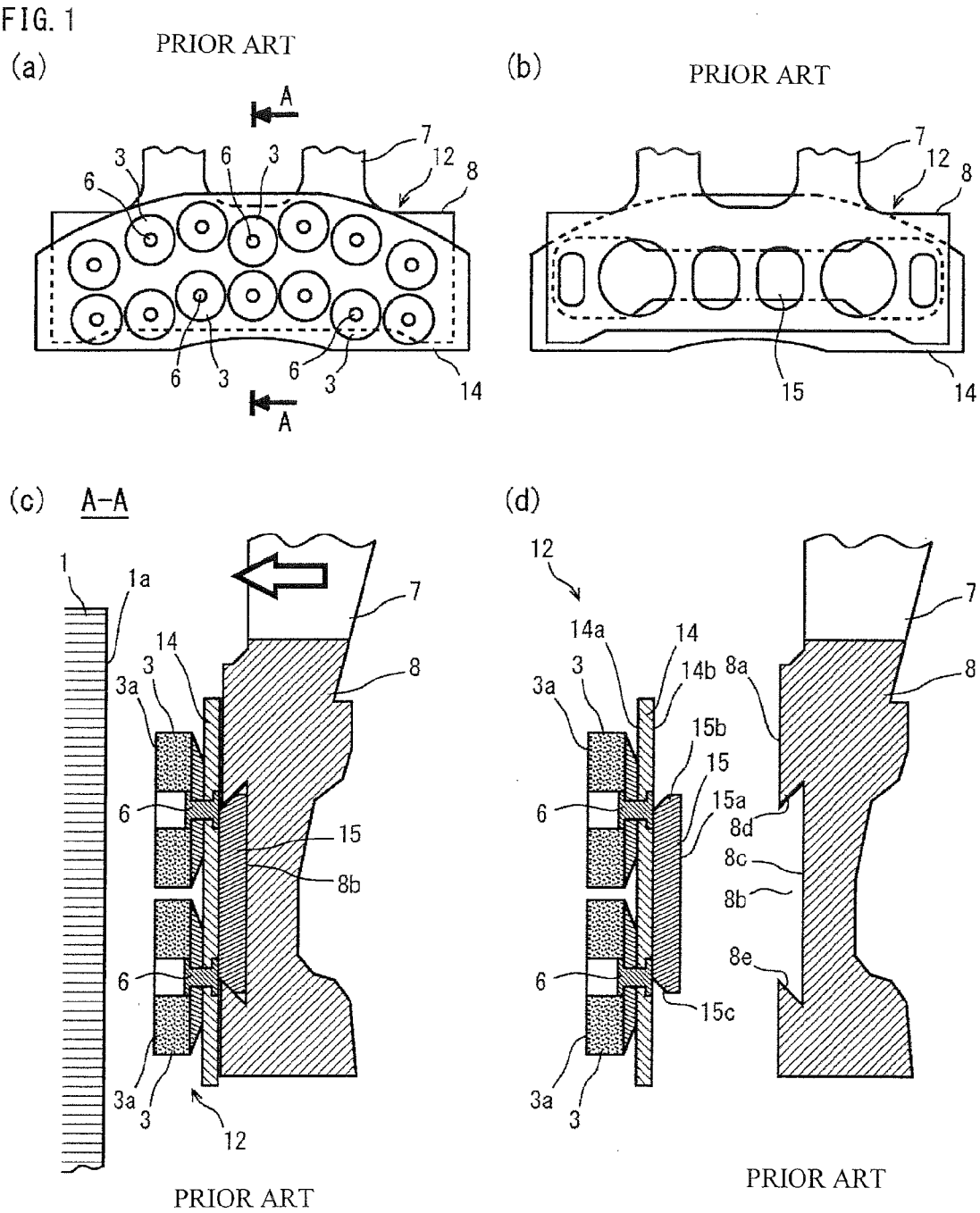
FIG. 1 shows an example of a configuration of a conventional disc brake for a railway vehicle, illustrating one side thereof on which the pressing drive source is not provided.

Hereinafter, embodiments of a brake lining and a disc brake for a railway vehicle according to the present invention will be described in detail.

FIG. 2 shows an example of a configuration of a disc brake for a railway vehicle according to the present invention, illustrating one side thereof on which the pressing drive source is not provided. In the figure, FIG. 2(a) is a cross-sectional view, and FIG. 2(b) is a cross-sectional view in a state in which a lining shown in FIG. 2(a) is detached from a caliper arm. Note that FIGS. 2(a) to 2(b) correspond to FIGS. 1(c) and 1(d), respectively. As for a non-pressing-drive-source side of the disc brake according to the present invention, a configuration in which the lining is viewed from a front surface side is the same as that shown in FIG. 1(a) and a configuration in which the lining is viewed from a back surface side is the same as that shown in FIG. 1(b).

The disc brake according to the present invention includes a brake disc 1, a brake lining, and a brake caliper to which this lining is mounted. The disc 1, which is of a doughnut disc shape, is fixed to a wheel or an axle (not shown) by bolts or the like, and strongly fastened thereto.

The caliper includes caliper arms extending to stride over the disc 1 and the caliper arms hold linings, respectively. Since the caliper used in the present invention is a floating caliper, a pressing drive source such as pistons is provided only on one caliper arm that is not shown in FIGS. 2(a) to 2(b) out of the caliper arms each holding the lining. The pressing drive source is actuated by hydraulic pressure or air pressure.

On a pressing-drive-source side, a lining holder is attached to the pressing drive source incorporated in the caliper arm, and this holder strongly holds the same lining as the conventional type lining 12 shown in FIG. 1 in a similar manner as a conventional manner. On the other hand, as shown in FIG. 2(a), on the non-pressing-drive-source side, the lining holder 8 is integrally incorporated into the caliper arm 7 similarly to that shown in FIG. 1. A concave portion 8b accommodating therein a guide plate 5 of a brake lining 2 according to the present invention, to be described later, is formed in this holder 8.

As shown in FIG. 2, the lining 2 according to the present invention, which is held by the caliper arm 7 on the non-pressing-drive-source side, configured to include a friction member 3 that faces a frictional surface 1a of a disc 1, a base plate 4 holding the friction member 3 on a front surface 4a, and the guide plate 5 fixedly provided at the center of a back surface 4b of the base plate 4. In FIG. 2, it is shown that a plurality of small-block-shaped friction members 3 are arranged similarly to FIG. 1.

Each of the friction members 3, which is made of a sintered copper material, a resin-based material or the like, has a circular planar shape and is attached to the base plate 4 by a rivet 6 inserted into a central portion of the friction member 3. The planar shape of the friction member 3 is not limited to the circular shape but may be a polygonal shape such as a quadrangular shape or a hexagonal shape. A spring member may be provided between the friction members 3 and the base plate 4 for elastically supporting the friction members 3. As the spring member, a disc spring can be applied or a plate spring or a coil spring can be also applied.

The front surface 4a of the base plate 4 is in parallel to a frictional surface 3a of the friction member 3. Furthermore, a thickness of the base plate 4 is larger on a side corresponding to an inner circumferential side of the disc 1 (which corresponds to a lower side in FIG. 2, hereinafter, also simply "inner circumferential side") than on a side corresponding to an outer circumferential side of the disc 1 (which corresponds to an upper side in FIG. 2, hereinafter, also simply "outer circumferential side").

From viewpoints of practicality, the back surface 4b of this base plate 4 is preferably an inclined surface inclined with respect to the front surface 4a thereof. It is also preferable that a difference between an outer circumferential side thickness 4to and an inner circumferential side thickness 4ti of the base plate 4 is within a range from 0.25 mm to 2.0 mm. More preferably, the difference is from 0.5 mm to 1.0 mm. As described later, when the difference between the outer circumferential side thickness and the inner circumferential side thickness of the base plate 4 is smaller than 0.25 mm, the heavier load tends to act on the outer circumferential side region of the friction member 3 if the back surface 4b of the base plate 4 contacts the front surface 8a of the holder 8 to follow the bending of the caliper arm 7 while the friction member 3 contacts the disc 1 during braking. On the other hand, if the thickness difference exceeds 2.0 mm, a heavier load conversely tends to act on the inner circumferential side region of the friction member 3. Such a range of the thickness difference of the base plate 4 corresponds to 0.1° to 1.0° in terms of an inclination angle of the back surface 4b with respect to the front surface 4a of the base plate 4.

A thickness 5t of the guide plate 5 is smaller than a depth of the concave portion 8b of the holder 8 (caliper arm 7). That is, the thickness 5t of the guide plate 5 is smaller than the thickness of the guide plate 15 of the conventional type lining 12 shown in FIG. 1. FIG. 2 shows an aspect in which the thickness 5t of the guide plate 5 is fixed and the back surface 5a of the guide plate 5 is in parallel to the back surface 4b of the base plate 4. However, as long as the thickness 5t of the guide plate 5 is smaller than the depth of the concave portion 8b of the holder 8, the thickness 5t of the guide plate 5 may be smaller on the inner circumferential side than on the outer circumferential side so that the back surface 5a of the guide plate 5 can be made in parallel to the front surface 4a of the base plate 4 as shown in, for example, FIG. 3.

In the lining 2 configured as described above, on the non-pressing-drive-source side, only upper and lower edges 5b and 5c of the guide plate 5 are engaged with upper and lower edges 8d and 8e of the concave portion 8b formed in the holder 8 of the caliper arm 7, respectively in a state in which the frictional surface 3a of each friction member 3 faces the frictional surface 1a of the disc 1 in parallel. That is, the guide plate 5 of the lining 2 on the non-pressing-drive-source side is fitted, with play, into the concave portion 8b of the holder 8 and the lining 2 is thereby movably attached to the caliper arm 7. In this fitted state with play, a cavity c1 is present between the back surface 5a of the guide plate 5 and the bottom surface 8c of the concave portion 8b of the holder 8, and a cavity c2 is present between the back surface 4b of the base plate 4 and the front surface 8a of the holder 8 (caliper arm 7). The front surface 8a of the holder 8 is in parallel to the frictional surface 1a of the disc 1.

In this way, the disc brake according to the present invention includes the lining 2 according to the present invention and provided on the caliper arm 7 on the non-pressing-drive-source side, and the conventional type lining 12 provided on the caliper arm on the pressing-drive-source side. During braking, on the pressing-drive-source side, the pressing drive source is actuated, whereby a pressing force is loaded onto the lining 12 from the pressing drive source and the lining 12 is pressed against the disc.

On the other hand, as shown in FIG. 2(a), on the non-pressing-drive-source side, a reaction force to the pressing force on the pressing-drive-source side is applied to the caliper arm 7, and the caliper arm 7 slidably moves toward the disc 1 (see a white arrow in FIG. 2(a)) and the lining 2 is pressed against the disc 1. At that time, since the frictional surface 3a of each friction member 3 is arranged to face the frictional surface 1a of the disc 1 in parallel, the friction member 3 contacts the disc 1 over the entire regions from the inner circumferential side region to the outer circumferential side region from the beginning of braking. Moreover, as the friction member 3 is pressed against the disc 1, the reaction force to the pressing force is applied to the caliper arm 7 and the caliper arm 7 is bent to open.

Following this, the cavity c2 between the back surface 4b of the base plate 4 and the front surface 8a of the holder 8 is closed and the cavity c1 between the back surface 5a of the guide plate 5 and the bottom surface 8c of the concave portion 8b of the holder 8 is made narrower. This is because the lining 2 is movably attached to the caliper arm 7 since the guide plate 5 is fitted, with play, into the concave portion 8b of the holder 8, and the thickness 5t of the guide plate 5 is smaller than the depth of the concave portion 8b of the holder 8.

In this way, during braking, on the non-pressing-drive-source side, the back surface 4b of the base plate 4 contracts the front surface 8a of the holder 8 in a wide range in a state in which the back surface 5a of the guide plate 5 does not contact the bottom surface 8c of the concave portion 8b of the holder 8. Therefore, the pressing force loaded onto the lining 2 does not act on the guide plate 5 of the lining 2 but directly acts on the base plate 4 of the lining 2. It is thereby possible to uniformly apply the pressing load to the entire regions of the friction member 3, that is, to ensure the constant pressure performance during braking. As a consequence, and also because of the contact of the friction member 3 with the disc 1 over the entire regions from the beginning of braking as described above, it is possible to prevent the partial wear of the friction member 3 and improve the durability.

EXAMPLES

To verify the advantageous effects of the present invention, the following FEM analysis (finite element method analysis) was executed.

[Outline of Analysis]

The FEM analysis was executed to evaluate the constant pressure performance of the friction member on the non-pressing-drive-source side during braking. In the analysis, elastic bodies were used as models of the caliper arm, the lining, and the disc, and a load corresponding to the pressing force was applied to the caliper arm. The load acting on the friction member at this time was evaluated. An analysis target was a disc brake used for Shinkansen (high-speed railway vehicle).

[Execution Conditions]

Table 1 shows a list of principal execution conditions for the FEM analysis.

TABLE 1

| Classification | Base plate thickness [mm] | | | Load acting position |
|---|---|---|---|---|
| | Outer circumferential side | Inner circumferential side | Thickness difference | |
| Inventive Example 1 | 4.0 | 5.0 | 1.0 | Base plate |
| Inventive Example 2 | 4.0 | 4.75 | 0.75 | Base plate |
| Inventive Example 3 | 4.25 | 4.75 | 0.5 | Base plate |
| Comparative Example 1 | 4.5 | 4.5 | 0 | Base plate |
| Comparative Example 2 | 4.5 | 4.5 | 0 | Guide plate |
| Comparative Example 3 | 4.0 | 4.75 | 0.75 | Guide plate |

In the FEM analysis, the disc brake shown in FIG. 2 was adopted and the analysis was executed for three aspects of Inventive Examples 1 to 3. In each case, the thickness of the base plate was set larger on the inner circumferential side than on the outer circumferential side, and the thickness difference changed among Inventive Examples 1 to 3, that is, the thickness difference was 1.0 mm in Inventive Example 1, 0.75 mm in Inventive Example 2, and 0.5 mm in Inventive Example 3. Furthermore, in each case, the depth of the concave portion of the holder was 7.8 mm, the thickness of the guide plate was smaller than the depth of the concave portion of the holder, i.e., 7 mm, and the pressing load was made to directly act on the base plate during braking.

As common conditions to Inventive Examples 1 to 3, a longitudinal length of the base plate (length in the direction corresponding to a circumferential direction of the disc) was 400 mm, and a widthwise length (length in the direction corresponding to a radial direction of the disc) was 141 mm. For materials of the respective members constituting the lining, the friction members were made of the sintered copper material and all the other parts were made of a steel material. The number of the friction members was 14 and the planar shape of each friction member was a circular shape at a diameter of 45 mm. The disc spring was provided between the friction members and the base plate as the spring member. Each friction member was fastened to the base plate by a rivet and the base plate was fastened to the guide plate by a rivet. The disc was generally disc-shaped at an inner diameter of 476 mm and an outer diameter of 724 mm.

The FEM analysis was carried out while the pressing forces in three conditions of 8 kN, 10 kN, and 12 kN were applied.

For comparison purposes, the analysis was executed to three aspects of Comparative Examples 1 to 3. In Comparative Example 1, the pressing load was made to directly act on the base plate during braking similarly to Inventive Examples 1 to 3, but the base plate thickness was constant differently from Inventive Examples 1 to 3. In Comparative Example 2, in which the conventional disc brake was assumed, the base plate thickness was constant and the pressing load was made to act on the guide plate during braking. In Comparative Example 3, the base plate thickness was thicker on the inner circumferential side than on the outer circumferential side similarly to Inventive Examples 1 to 3, but the pressing force was made to act on the guide plate during braking differently from Inventive Examples 1 to 3.

[Evaluation Method]

The object of the present invention is to ensure the constant pressure performance of the friction members on the non-pressing-drive-source side. Owing to this, as an index corresponding to the object, a load acting on each of the friction members was extracted by the FEM analysis, and a standard deviation of each load was calculated from an extracted load value. If the standard deviation of the load was smaller, it was evaluated that the constant pressure performance of the friction member was higher.

[Result]

Table 2 shows a result of the FEM analysis.

TABLE 2

| Classification | Standard deviation [N] of load acting on friction member | | | |
|---|---|---|---|---|
| | Pressing force | | | Average of results of three |
| | 8 [kN] | 10 [kN] | 12 [kN] | conditions of left |
| Inventive Example 1 | 277.82 | 186.92 | 111.22 | 191.98 |
| Inventive Example 2 | 120.90 | 69.67 | 121.68 | 104.08 |
| Inventive Example 3 | 82.08 | 175.27 | 274.73 | 177.36 |
| Comparative Example 1 | 415.18 | 513.97 | 610.96 | 513.36 |
| Comparative Example 2 | 375.58 | 465.91 | 554.82 | 465.44 |
| Comparative Example 3 | 383.76 | 464.80 | 553.49 | 467.35 |

According to the result shown in Table 2, the standard deviation of the load acting on the friction member was smaller in Inventive Examples 1 to 3 than in Comparative Examples 1 to 3, and the constant pressure performance was improved by changing both of the thickness shape of the base plate and the thickness shape of the guide plate.

INDUSTRIAL APPLICABILITY

The brake lining and the disc brake for the railway vehicle according to the present invention can be effectively used for any types of railway vehicles and particularly useful for the high-speed railway vehicle the travelling speed of which has a wide range from low speed to high speed.

REFERENCE SIGNS LIST

1: brake disc
1a: frictional surface
2: brake lining
3: friction member
3a: frictional surface
4: base plate
4a: front surface
4b: back surface
4to: outer circumferential side thickness
4ti: inner circumferential side thickness
5: guide plate
5t: thickness
5a: back surface
5b: upper edge
5c: lower edge
6: rivet
7: caliper arm
8: lining holder
8a: front surface
8b: concave portion
8c: bottom surface
8d: upper edge
8e: lower edge
c1: cavity
c2: cavity
12: conventional type brake lining
14: base plate
14a: front surface
14b: back surface
15: guide plate
15a: back surface
15b: upper edge
15c: lower edge

What is claimed is:

1. A brake lining which is provided to a disc brake for a railway vehicle using a floating brake caliper, the floating brake caliper including caliper arms each striding over a brake disc fixed to a wheel or an axle of the railway vehicle; the brake lining held by each of the caliper arms; and a pressing drive source provided only on one of the caliper arms each holding the brake lining, wherein the brake lining held by the caliper arm on a side on which the pressing drive source is not provided, the brake lining comprises:

a friction member facing a frictional surface of the brake disc; a base plate holding the friction member on a front surface; and a guide plate fixedly provided at center of a back surface of the base plate, and accommodated in a concave portion of the caliper arm, on the side on which the pressing drive source is not provided, the front surface of the base plate is in parallel to a frictional surface of the friction member, a thickness of the base plate is larger on a side corresponding to an inner circumferential side of the brake disc than on a side corresponding to an outer circumferential side of the brake disc, and a thickness of the guide plate is smaller than a depth of the concave portion of the caliper arm, and on the side on which the pressing drive source is not provided, in a state in which the frictional surface of the friction member faces the frictional surface of the brake disc in parallel, the guide plate is fitted, with play, into the concave portion of the caliper arm.

2. The brake lining for a railway vehicle according to claim 1, wherein the back surface of the base plate is an inclined surface inclined with respect to the front surface.

3. The brake lining for a railway vehicle according to claim 1 or 2, wherein the thickness of the base plate is larger on the side corresponding to the inner circumferential side of the brake disc by 0.25 mm to 2.0 mm than on the side corresponding to the outer circumferential side of the brake disc.

4. The brake lining for a railway vehicle according to claim 2, wherein the thickness of the base plate is larger on the side corresponding to the inner circumferential side of the brake disc by 0.25 mm to 2.0 mm than on the side corresponding to the outer circumferential side of the brake disc.

5. The brake lining for a railway vehicle according to claim 1, wherein in a state in which the guide plate is fitted, with play, into the concave portion of the caliper arm, a cavity is present between the back surface of the guide plate and the concave portion of the holder and a cavity is present between the back surface of the base plate and the caliper arm.

6. The brake lining for a railway vehicle according to claim 2, wherein in a state in which the guide plate is fitted, with play, into the concave portion of the caliper arm, a cavity is present between the back surface of the guide plate and the concave portion of the holder and a cavity is present between the back surface of the base plate and the caliper arm.

7. The brake lining for a railway vehicle according to claim 3, wherein in a state in which the guide plate is fitted, with play, into the concave portion of the caliper arm, a cavity is present between the back surface of the guide plate and the concave portion of the holder and a cavity is present between the back surface of the base plate and the caliper arm.

8. The brake lining for a railway vehicle according to claim 4, wherein in a state in which the guide plate is fitted, with play, into the concave portion of the caliper arm, a cavity is present between the back surface of the guide plate and the concave portion of the holder and a cavity is present between the back surface of the base plate and the caliper arm.

9. A disc brake for a railway vehicle comprising the brake lining according to claim 1.

10. A disc brake for a railway vehicle comprising the brake lining according to claim 2.

11. A disc brake for a railway vehicle comprising the brake lining according to claim 3.

12. A disc brake for a railway vehicle comprising the brake lining according to claim 4.

13. A disc brake for a railway vehicle comprising the brake lining according to claim 5.

14. A disc brake for a railway vehicle comprising the brake lining according to claim 6.

15. A disc brake for a railway vehicle comprising the brake lining according to claim 7.

16. A disc brake for a railway vehicle comprising the brake lining according to claim 8.

* * * * *